US012766642B2

(12) United States Patent
Fujii et al.

(10) Patent No.: US 12,766,642 B2
(45) Date of Patent: Oct. 20, 2026

(54) LASER PROCESSING APPARATUS AND LASER PROCESSING METHOD

(71) Applicant: Mitsubishi Electric Corporation, Tokyo (JP)

(72) Inventors: Kenta Fujii, Tokyo (JP); Kyohei Ishikawa, Tokyo (JP); Nobuaki Tanaka, Tokyo (JP); Motoaki Nishiwaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 493 days.

(21) Appl. No.: 18/281,565

(22) PCT Filed: Apr. 6, 2021

(86) PCT No.: PCT/JP2021/014637
§ 371 (c)(1),
(2) Date: Sep. 12, 2023

(87) PCT Pub. No.: WO2022/215169
PCT Pub. Date: Oct. 13, 2022

(65) Prior Publication Data

US 2024/0316698 A1 Sep. 26, 2024

(51) Int. Cl.
*B23K 26/70* (2014.01)
*B23K 26/03* (2006.01)
(Continued)

(52) U.S. Cl.
CPC ............ *B23K 31/125* (2013.01); *B23K 26/03* (2013.01); *B23K 26/032* (2013.01);
(Continued)

(58) Field of Classification Search
CPC .... B23K 26/705; B23K 26/707; B23K 26/03; B23K 26/032; B23K 26/035; B23K 26/04;
(Continued)

(56) References Cited

U.S. PATENT DOCUMENTS 8,558,135 B2 * 10/2013 Calefati ................. B23K 31/12
706/904
10,643,127 B2 * 5/2020 Takigawa ............. B23K 26/032
(Continued)

FOREIGN PATENT DOCUMENTS

JP 2000-146852 A 5/2000
JP 2001-255921 A 9/2001
(Continued)

OTHER PUBLICATIONS

International Search Report and Written Opinion mailed on Jun. 22, 2021, received for PCT Application PCT/JP2021/014637, filed on Apr. 6, 2021, 9 pages including English Translation.
(Continued)

*Primary Examiner* — Alain Chau
(74) *Attorney, Agent, or Firm* — XSENSUS LLP

(57) ABSTRACT

A laser processing apparatus includes a control device controlling laser processing in accordance with processing condition; a detection unit observing processing state on a time-series basis during laser processing and outputting a signal corresponding to observation result as a time-series signal; a parameter estimation unit estimating and outputting, based on first time-series signal data including the time-series signal and/or a first feature computed from the time-series signal and preset corresponding parameter information indicating relationship between the first time-series signal data and at least one parameter value included in the processing condition, a parameter estimate corresponding to
(Continued)

the first time-series signal data; a condition change amount determination unit comparing a target parameter value and the parameter estimate and determining a change amount for the processing condition based on comparison result; and a parameter update unit updating the processing condition based on the change amount and the processing condition.

20 Claims, 7 Drawing Sheets

(51) Int. Cl.
*B23K 31/00* (2006.01)
*B23K 31/12* (2006.01)
*G05B 13/02* (2006.01)

(52) U.S. Cl.
CPC .......... *B23K 26/705* (2015.10); *B23K 26/707* (2015.10); *B23K 31/006* (2013.01); *G05B 13/027* (2013.01); *G05B 2219/45041* (2013.01)

(58) Field of Classification Search
CPC .... B23K 26/042; B23K 26/046; B23K 26/06; B23K 31/003; B23K 31/006; B23K 31/125; G05B 2219/45041; G05B 13/027; G05B 13/0265; G05B 13/0285; G05B 13/029
See application file for complete search history.

(56) References Cited

U.S. PATENT DOCUMENTS 10,664,767 B2 * 5/2020 Takigawa ............. B23K 26/707
11,093,828 B2 * 8/2021 Takigawa ................. G06N 3/02
11,351,630 B2 * 6/2022 Tanaka ................... G01N 29/46
12,383,977 B2 * 8/2025 Kroschel .............. B23K 31/125
2001/0027354 A1 10/2001 Kakino et al.
2011/0192825 A1 * 8/2011 Calefati ................. B23K 31/12 219/121.64
2017/0220927 A1 * 8/2017 Takigawa ............. B23K 26/032
2017/0270434 A1 9/2017 Takigawa et al.
2018/0260712 A1 * 9/2018 Hatada ................... G06N 3/086
2019/0213479 A1 * 7/2019 Takigawa ................. G06N 3/08
2019/0291215 A1 9/2019 Izumi
2020/0254559 A1 * 8/2020 Lüdi .................... B23K 26/032
2020/0387131 A1 * 12/2020 Takigawa ............... G06N 3/092
2021/0354234 A1 * 11/2021 Tanaka ................... G01N 29/46
2022/0032395 A1 * 2/2022 Kroschel .............. B23K 26/382
2023/0201956 A1 * 6/2023 Schwarz .............. B23K 1/0056 219/121.85

FOREIGN PATENT DOCUMENTS

JP 2017-164801 A 9/2017
JP 2019-166559 A 10/2019
JP 6818970 B1 1/2021

OTHER PUBLICATIONS

Notice of Reason for Refusal mailed on Dec. 14, 2021, received for PCT Application 2021-551593, 10 pages Including English Translation.
Notice of Reason for Refusal mailed on Jul. 12, 2022, received for PCT Application 2021-551593, 10 pages including English Translation.
Notice of Reason for Refusal mailed on Jan. 17, 2023, received for PCT Application 2021-551593, 9 pages Including English Translation.

* cited by examiner

LASER PROCESSING APPARATUS AND LASER PROCESSING METHOD

CROSS-REFERENCE TO RELATED APPLICATION

This application is based on PCT filing PCT/JP2021/014637, filed Apr. 6, 2021, the entire contents of which are incorporated herein by reference.

FIELD

The present disclosure relates to a laser processing apparatus that performs laser processing and a laser processing method.

BACKGROUND

Laser processing refers to irradiating a workpiece with a condensed laser light to, for example, melt and evaporate the workpiece for changing the workpiece's shape. In laser processing, various processing defects such as dross and flaws occur depending on a state of a laser processing apparatus, a state of the workpiece, or a processing condition.

Even if processing initially produces good processing results, processing defects can occur due to changing temperature of the workpiece or an optical component during processing, varied surface conditions at positions of the workpiece that cause a center of the laser light and a central axis of processing gas to become misaligned, and other factors.

A delayed processing defect detection contributes to many defectives produced, leading to a decrease in production efficiency. However, finding processing defects during processing is difficult for an operator, and in many cases, the processing defects are only discovered by visually checking the workpiece after the processing is completed. Therefore, techniques that involve observing a processing state with sensors and adjusting a processing condition on the basis of the observed processing state have been developed to obtain good processing results.

A laser processing apparatus described in Patent Literature 1 performs learning in which a laser processing condition, a target deviation of an assist gas pressure loss or flow rate, and determination data indicating determined quality of a workpiece processed on the basis of the laser processing condition are used for associating the target deviation of the assist gas pressure loss or flow rate and adjustment of the laser processing condition with each other.

CITATION LIST

Patent Literature

Patent Literature 1: Japanese Patent Application Laid-open No. 2019-166559

SUMMARY OF INVENTION

Problem to be Solved by the Invention

However, the above technique described in Patent Literature 1 requires that processing and quality evaluation be performed a very large number of times for the learning, in which the target deviation of the assist gas pressure loss or flow rate and the adjustment of the laser processing condition for laser processing are associated with each other. Therefore, a problem with the above technique described in Patent Literature 1 is that the adjustment of the laser processing condition is difficult.

The present disclosure has been made in view of the above, and an object of the present disclosure is to obtain a laser processing apparatus capable of easy adjustment to a processing condition that can yield a good processing result in laser processing.

Means to Solve the Problem

In order to solve the above-stated problem and achieve the object, a laser processing apparatus according to the present disclosure includes a control device that controls laser processing in accordance with a processing condition for the laser processing and a detection unit that observes a processing state on a time-series basis during the laser processing and outputs a signal corresponding to an observation result as a time-series signal. The laser processing apparatus according to the present disclosure also includes a parameter estimation unit that estimates, on a basis of first time-series signal data and corresponding parameter information, a parameter estimate corresponding to the first time-series signal data as an estimated value of a parameter and outputs the parameter estimate. The first time-series signal data includes at least one of the time-series signal or a first feature computed from the time-series signal. The corresponding parameter information is preset and indicates a relationship between the first time-series signal data and at least one parameter value included in the processing condition. The laser processing apparatus according to the present disclosure also includes a condition change amount determination unit that compares a target parameter value that is a target value for the parameter value and the parameter estimate and determines an amount of change for the processing condition on a basis of a comparison result and a parameter update unit that updates the processing condition to a new processing condition on a basis of the amount of change and the processing condition.

Effects of the Invention

The laser processing apparatus according to the present disclosure has an advantage of allowing for easy adjustment to the processing condition that can yield a good processing result in laser processing.

DESCRIPTION OF EMBODIMENTS

With reference to the drawings, a detailed description is hereinafter provided of laser processing apparatuses and laser processing methods according to embodiments of the present disclosure.

First Embodiment

Figure 1:
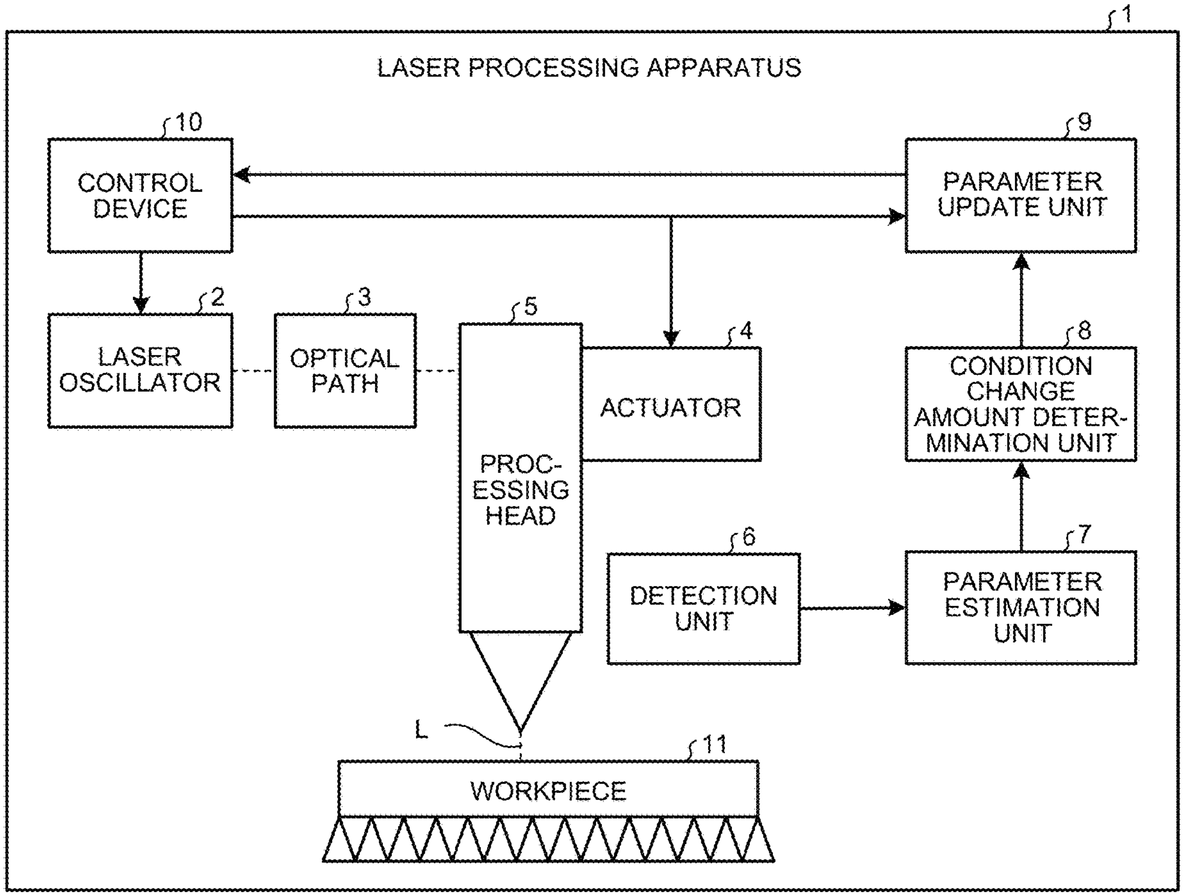
FIG. 1 is a diagram illustrating a configuration of a laser processing apparatus according to a first embodiment.

FIG. 1 is a diagram illustrating a configuration of a laser processing apparatus according to a first embodiment. A laser processing apparatus 1 is an apparatus that condenses a laser light L and irradiates a workpiece 11 with the laser light L condensed to, for example, melt and evaporate the workpiece 11 for changing the shape of the workpiece 11. The laser processing apparatus 1 performs, for example, cutting to cut out from the sheet-shaped workpiece 11.

The laser processing apparatus 1 may be an apparatus that performs laser welding for joining two metal plates, in which case the workpieces 11 are irradiated with the laser light L to melt their joining parts and are then cooled, thereby bringing the two metal plates together. The laser processing apparatus 1 may be an apparatus that performs additive manufacturing in which metal powder or a metal wire is sintered and stacked.

The laser processing apparatus 1 includes a laser oscillator 2, an optical path 3, an actuator 4, a processing head 5, a detection unit 6, a parameter estimation unit 7, a condition change amount determination unit 8, a parameter update unit 9, and a control device 10. FIG. 1 illustrates dotted lines representing the laser light L. The laser processing apparatus 1 may include a display unit not illustrated. In this case, the display unit may be a part of the control device 10.

The laser oscillator 2 oscillates and emits the laser light L. The laser oscillator 2 is of a non-limiting type. The laser oscillator 2 is, for example, a fiber laser oscillator but may be a carbon dioxide laser oscillator or a solid-state laser oscillator using an yttrium aluminum garnet (YAG) crystal or another material as an excitation medium. The laser oscillator 2 may be a laser such as a direct diode laser that directly uses light from a laser diode. The laser light L emitted from the laser oscillator 2 is supplied to the processing head 5 via the optical path 3.

The optical path 3 is a path that transmits the laser light L output from the laser oscillator 2 to the processing head 5. The optical path 3 may be a path along which the laser light L is propagated through air or a path along which the laser light L is transmitted through an optical fiber. The optical path 3 needs to be designed in accordance with characteristics of the laser light L.

The processing head 5 includes an optical system that focuses the laser light L on the workpiece 11. The optical system included in the processing head 5 preferably provides a focal point near a surface of the workpiece 11. The processing head 5 has a function of irradiating the workpiece 11 with the laser light L. The processing head 5 preferably includes a mechanism that squirts processing gas from a nozzle at the surface of the workpiece 11 during processing in order for good processing results to be obtained.

The actuator 4 is a servo control device including at least one set of a motor and a position detector and is capable of changing relative position between the processing head 5 and the workpiece 11 through control. Since the actuator 4 needs only to have function of controlling the relative position between the processing head 5 and the workpiece 11, the actuator 4 may have at least one of a function of shifting the processing head 5 or a function of shifting the workpiece 11. A specific example of the actuator 4 is a servo control device including a linear motor and a position detector. The actuator 4 may employ a drive system using a motor and a gear. The actuator 4 may be a control mechanism including a rotation shaft. The processing head 5 irradiates the workpiece 11 with the supplied laser light L.

In accordance with a processing condition for laser processing, the control device 10 controls the laser oscillator 2, the actuator 4, and the processing head 5 so that the laser light L scans over the workpiece 11.

The detection unit 6 includes an optical sensor or the like that observes a processing state on a time-series basis during processing and outputs an observation result as a time-series signal to the parameter estimation unit 7. The detection unit 6 measures, as the time-series signal, the measurement of a physical quantity such as an intensity and a wavelength of light generated during processing and a sound wave and an ultrasonic wave generated during processing.

The detection unit 6 is, for example, a photodiode that measures the intensity of reflected light from the workpiece 11 and outputs the light intensity measured during processing as the time-series signal that indicates time-series information. Other examples of the detection unit 6 include a charge-coupled device (CCD) sensor, a complementary metal-oxide-semiconductor (CMOS) sensor, a spectroscope, and an acoustic sensor, among others. The detection unit 6 may be a combination of the above examples. In cases where the laser light L is transmitted with the optical fiber, the detection unit 6 may detect light that is generated during processing and transmitted via the optical fiber.

Moreover, although not a sensor that directly monitors the processing state, a sensor that observes a state or an atmosphere of the laser processing apparatus 1, such as a temperature sensor or a humidity sensor, may be added to the detection unit 6. It is preferable that the detection unit 6 use plural or assorted sensors for accurately observing the processing state and the state of the laser processing apparatus 1.

The parameter estimation unit 7 uses time-series signal data including at least one of the time-series signal obtained from the detection unit 6 or a feature computed from the time-series signal obtained from the detection unit 6 to compute and output a parameter estimate corresponding to the time-series signal data. The time-series signal data that the parameter estimation unit 7 uses is first time-series signal data, and the feature that the parameter estimation unit 7 uses is a first feature.

The parameter estimation unit 7 is preconfigured to include a relationship (hereinafter referred to as corresponding parameter information) between time-series signal data and a value of at least one parameter that (referring to the parameter estimate to be described later) is set in the processing condition. On the basis of the time-series signal data obtained during the processing and the corresponding parameter information, the parameter estimation unit 7 computes and outputs to the condition change amount determination unit 8 the parameter estimate that corresponds to the time-series signal data obtained during the processing.

A variety of values are usable as the features in the parameter estimation unit 7. The features are, for example, a mean and a standard deviation of the time-series signal obtained from the detection unit 6. In this case, the corresponding parameter information includes the preregistered parameter estimate that corresponds to a set of the mean and the standard deviation of the time-series signal. Thus the parameter estimation unit 7 reads, for output, the parameter estimate that corresponds to the mean and the standard deviation of the input time-series signal from the corresponding parameter information.

The parameter estimation unit 7 switches a method of determining the feature(s) according to the configuration of the detection unit 6 or the type of detection unit 6. There are various methods by which the parameter estimation unit 7 determines the features. For example, the parameter estimation unit 7 can analyze the time-series signal obtained from the detection unit 6 by a method such as statistical analysis, frequency analysis, a Fourier transform, a digital Fourier transform, filterbank analysis, or a wavelet transform, and determine a set of values obtained thus or a set of statistics derived from the obtained values as the features. The methods mentioned here for determining the features are examples. The parameter estimation unit 7 may use a general analysis method for determining the feature(s) from the time-series signal.

The corresponding parameter information preset in the parameter estimation unit 7 needs only to be information that indicates the correspondence between the parameter estimate targeted for update and the time-series signal data. In other words, the corresponding parameter information may be a data table where the parameter estimate and the time-series signal data are associated in a one-to-one relationship or a mathematical formula (a function to be described later) that can derive the parameter estimate from the time-series signal data.

When obtaining the corresponding parameter information to be set in the parameter estimation unit 7, laser processing is performed using plural processing conditions that have different values specified for the parameter to be updated. The time-series signal data obtained during the laser processings, the processing condition, and a processing result are stored in a database or the like. When the corresponding parameter information is to be set in the parameter estimation unit 7, the correspondence between the parameter value targeted for update and the time-series signal data needs only to be extracted from this database. The database may be within the laser processing apparatus 1 or external to the laser processing apparatus 1.

When the time-series signal data and the processing condition are to be obtained for storage in the database, the values of the parameter to be updated need only to be set differently within a configurable range of the parameter or a parameter range expected to bring about good processings. For example, the acquisition of the time-series signal data and the processing condition for storage in the database is carried out by dividing the configurable range into several to several tens of segments and performing the laser processings with the parameter values set respectively for the segments. In the first embodiment, such a smaller number of processings are performed when obtaining the corresponding parameter information, which indicates the correspondence between the parameter value targeted for update and the time-series signal data.

A corresponding parameter information preparer can obtain the corresponding parameter information, which indicates the correspondence between the parameter value targeted for update and the time-series signal data, by selecting data from the database according to the processing result. Specifically, as described above, the laser processing is performed using each of the plural processing conditions that have the different values specified for the parameter to be updated, and the time-series signal data, the processing condition, and the processing result are stored in the database or the like. The processing result of the laser processings is obtained, for example, by an operator's evaluation of a processed surface. In this case, the operator determines whether the result is good or bad, identifies symptoms of any defects, and determines each degree of defectiveness, among others. These determination results are recorded as the processing result. The determination of whether the result is good or bad, the identification of the symptom(s) of the defect(s), the determination of the degree of defectiveness, and others may be done by analysis of a photograph taken by a camera or another device. These determination results may be recorded as the processing result.

After the processing results are recorded, the corresponding parameter information preparer selects the data from the database on the basis of the processing result and extracts, with the selected data, the correspondence between the parameter value targeted for update and the time-series signal data as the corresponding parameter information.

There are various methods for selecting data with respect to the processing result. For example, in order for the parameter value to be updated solely on the basis of the good result, the corresponding parameter information preparer may select only data with good processing results. To easily obtain the correspondence between the parameter value targeted for update and the time-series signal data, the corresponding parameter information preparer may select the processing results, which have been yielded by the different values of the parameter to be updated, one by one.

There are various methods for configuring the corresponding parameter information, which indicates the correspondence between the time-series signal data and the parameter estimate, from the database. For example, the corresponding parameter information preparer may directly define a value range for the time-series signal data and set the corresponding parameter estimate. The corresponding parameter information preparer may have the corresponding parameter information expressed by a function that indicates the correspondence between the time-series signal data and the parameter estimate. The function in this case may be a function approximating the correspondence between the time-series signal data and the parameter estimate. The corresponding parameter information preparer may have the function that indicates the corresponding parameter information in the form of a regression model learned to output the parameter estimate as the time-series signal data is input. In other words, the function that indicates the corresponding parameter information may be the regression model trained by regression learning to output the parameter value corresponding to the input time-series signal data.

If used, the regression model is a general regression model such as linear regression, support vector regression, Gaussian process regression, regression using decision trees (regression trees), a neural network, a deep neural network, a recurrent neural network, or a convolutional neural network.

The condition change amount determination unit 8 compares a preset target parameter value and the parameter estimate output from the parameter estimation unit 7 and determines an amount of change for the processing condition on the basis of a comparison result.

The target parameter value is set in the condition change amount determination unit 8 on the basis of the processing result yielded in order for the corresponding parameter information set in the parameter estimation unit 7 to be obtained. A target parameter value preparer needs only to examine each processing result, which has been yielded in order for the corresponding parameter information to be obtained, and set a parameter value corresponding to a processing result desired by the operator as the target parameter value in the condition change amount determination unit 8.

For example, an appropriate parameter value is selected from among the used parameter values that have yielded the processing results determined as being good by the operator among the processing results yielded for the corresponding parameter information set in the parameter estimation unit 7 to be obtained. This appropriate parameter value is set in the condition change amount determination unit 8 as the target parameter value.

As specific examples, the following case examples are conceivable. The target parameter value preparer may select gas pressure as the parameter to be updated. In this case, in order to reduce gas consumption, the target parameter value preparer selects the lowest gas pressure from among gas pressures that have yielded processing results determined as being good among processing results yielded for corresponding parameter information to be obtained. The target parameter value preparer sets this lowest gas pressure as the target parameter value.

The target parameter value preparer may select processing speed as the parameter to be updated. In this case, in order to enable fast processing compared to a current state, the target parameter value preparer selects the highest processing speed from among processing speeds that have yielded processing results determined as being good among processing results yielded for corresponding parameter information to be obtained. The target parameter value preparer sets this highest processing speed as the target parameter value.

If the parameter value targeted for update has been sequentially changed from a small value to a large value to yield processing results in order for good processing results to be consistently obtained, the target parameter value to be set may be an average of a maximum and a minimum within a range of sequential parameter values that have yielded processing results determined as being good.

The condition change amount determination unit 8 compares the preset target parameter value and the parameter estimate output from the parameter estimation unit 7 and determines the amount of change for the processing condition on the basis of the comparison result. If the parameter estimate is smaller than the target parameter value, the condition change amount determination unit 8 determines that the amount of change should be positive. If the parameter estimate is larger than the target parameter value, the condition change amount determination unit 8 determines that the amount of change should be negative.

In its step of comparing the target parameter value and the parameter estimate, the condition change amount determination unit 8 may compute a difference or a ratio between the target parameter value and the parameter estimate, or a magnitude relation. After performing its appropriate step based on the comparison method, the condition change amount determination unit 8 determines the amount of change for the processing condition. When using, for example, the difference between the target parameter value and the parameter estimate (i.e., the target parameter value−the parameter estimate), the condition change amount determination unit 8 can determine the amount of change for the processing condition by multiplying the difference by a value greater than 0 and smaller than 1. The condition change amount determination unit 8 sends the amount of change for the processing condition to the parameter update unit 9.

The parameter update unit 9 obtains the amount of change for the processing condition from the condition change amount determination unit 8 and also obtains the processing condition from a storage unit (not illustrated) within the laser processing apparatus 1 or the like. The processing condition that the parameter update unit 9 obtains, for example, from the storage unit is what is being set in the control device 10.

On the basis of the amount of change obtained from the condition change amount determination unit 8 for the processing condition and the processing condition being set in the control device 10, the parameter update unit 9 sets a new processing condition in the control device 10. In other words, the parameter update unit 9 changes over to the new processing condition on the basis of the amount of change determined by the condition change amount determination unit 8 for the processing condition and the current processing condition. Specifically, the parameter update unit 9 adds the amount of change for the processing condition to the current processing condition to have the processing condition that has undergone the addition reflected in the control device 10 as the new processing condition. In other words, the parameter update unit 9 adds a parameter value set as the amount of change for the processing condition to a parameter value set in the current processing condition and sends the parameter value that has undergone the addition to the control device 10 as a new one in the processing condition.

If the parameter update unit 9 is to apply the parameter value adjustment only to specified sections, the operation of the parameter update unit 9 needs only to be suspended outside the specified sections and apply exclusively to the specified sections.

For example, when the parameter value adjustment is to be applied only to straight sections, the parameter update unit 9 may operate only during straight processing. The operation of the parameter update unit 9 may be applied, for example, only to prespecified sections of a processing path specified by the control device 10.

The processing condition set in the control device 10 includes conditions such as operating conditions of the laser oscillator 2, the optical path 3, the actuator 4, and the processing head 5. Specific examples of the operating conditions of the laser oscillator 2 that are set in the processing condition include an output intensity (beam output intensity), an output frequency, an output duty ratio, a beam mode, a waveform, and a wavelength of the laser light L, among others.

Specific examples of the conditions of the optical path 3, the actuator 4, and the processing head 5 that are set in the processing condition include an optical system of the optical path 3, beam magnification or the like of a light collection optical system, focal position of the laser light L relative to the workpiece 11, a diameter of the laser light L converged, distance between the workpiece 11 and the processing head 5, a type of processing gas, the pressure of the processing gas, a hole diameter of the nozzle of the processing head 5, a height at which the nozzle is to be as measured from the workpiece 11, a type of nozzle, and the processing speed, among others.

The processing condition may also include properties of the workpiece 11, such as material, thickness, and surface condition. The processing condition given here is an example. The items of the processing condition can be increased or decreased in accordance with the type of laser processing apparatus 1, a processing purpose, equipment of the laser processing apparatus 1, and others.

The parameter to be updated by the parameter update unit 9 needs only to be any of those parameters included in the processing condition that can be represented numerically and can be modified during processing without interrupting the processing.

Specific examples of the parameter to be updated include the output intensity, the output frequency, the output duty ratio, the beam mode, the waveform, and the wavelength of the laser light L, the beam magnification, the focal position relative to the workpiece 11, the diameter of the converged beam, the distance between the workpiece 11 and the processing head 5, the type of processing gas, the pressure of the processing gas, the hole diameter of the nozzle, the height at which the nozzle is to be as measured from the workpiece 11, the type of nozzle, and the processing speed, among others.

Figure 2:
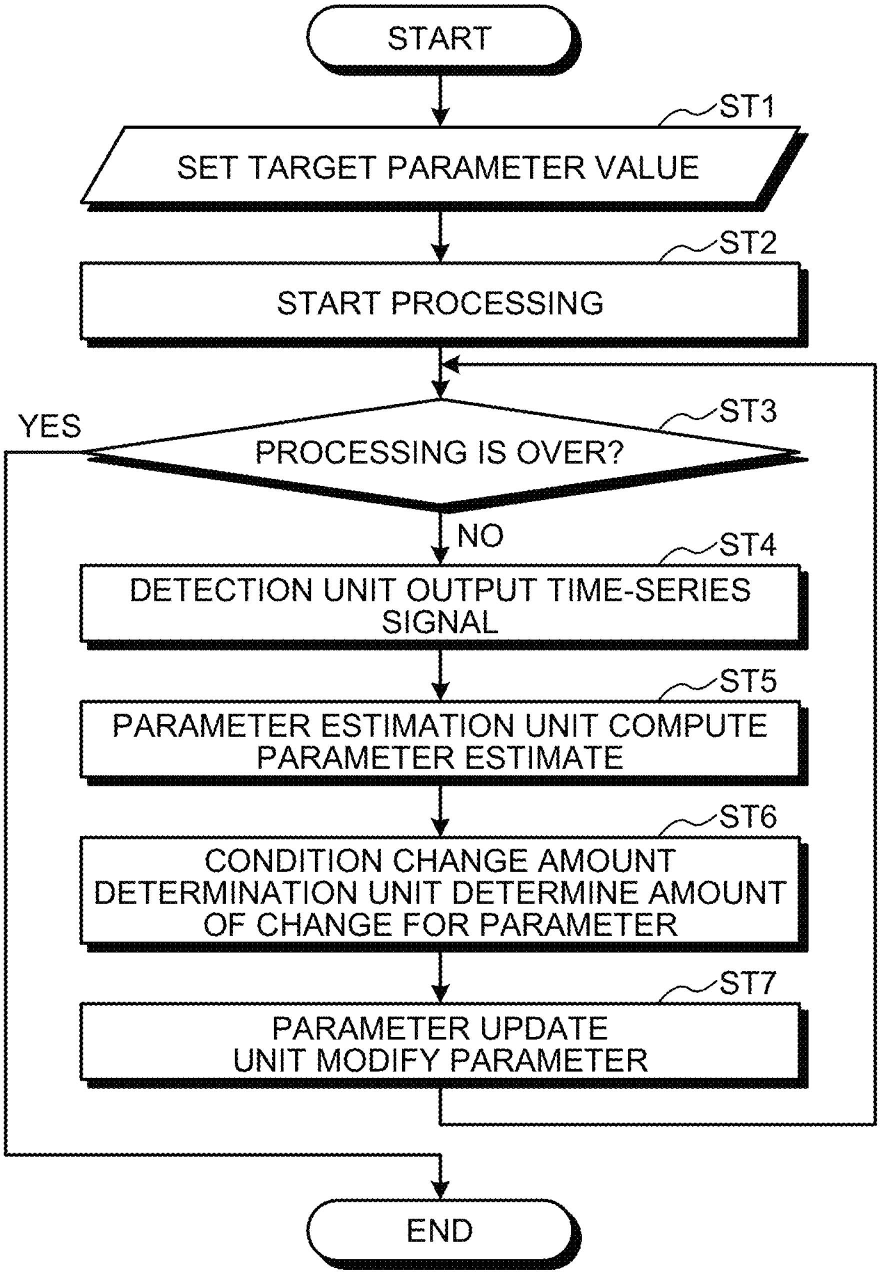
FIG. 2 is a flowchart illustrating a procedure for parameter modification process to be performed by the laser processing apparatus according to the first embodiment.

FIG. 2 is a flowchart illustrating a procedure for parameter modification process to be performed by the laser processing apparatus according to the first embodiment. First, the operator sets the target parameter value that has yielded satisfactory processing in the condition change amount determination unit 8 (step ST1), and then the laser processing apparatus 1 starts processing (step ST2).

The laser processing apparatus 1 determines whether or not the processing is over (step ST3). If the processing is over (step ST3, Yes), the laser processing apparatus 1 ends the parameter modification process. If, on the other hand, the processing is not over (step ST3, No), the detection unit 6 of the laser processing apparatus 1 observes a processing state and outputs a time-series signal to the parameter estimation unit 7 (step ST4).

The parameter estimation unit 7 receives the time-series signal from the detection unit 6 and computes the parameter estimate (step ST5). Specifically, upon receiving the time-series signal from the detection unit 6, the parameter estimation unit 7 estimates the parameter estimate on the basis of the corresponding parameter information and time-series signal data that includes at least one of the received time-series signal or a feature computed from this time-series signal. The parameter estimation unit 7 outputs the parameter estimate to the condition change amount determination unit 8.

The condition change amount determination unit 8 determines an amount of change intended for the parameter on the basis of the parameter estimate and the target parameter value (step ST6). The condition change amount determination unit 8 outputs the amount of change for the parameter to the parameter update unit 9.

The parameter update unit 9 modifies the parameter of the processing condition on the basis of the amount of change for the parameter (step ST7). The parameter value of the processing condition is updated thus. Thereafter, the laser processing apparatus 1 returns to step ST3, and repeats steps ST3 to ST7 until the processing ends.

Figure 3:
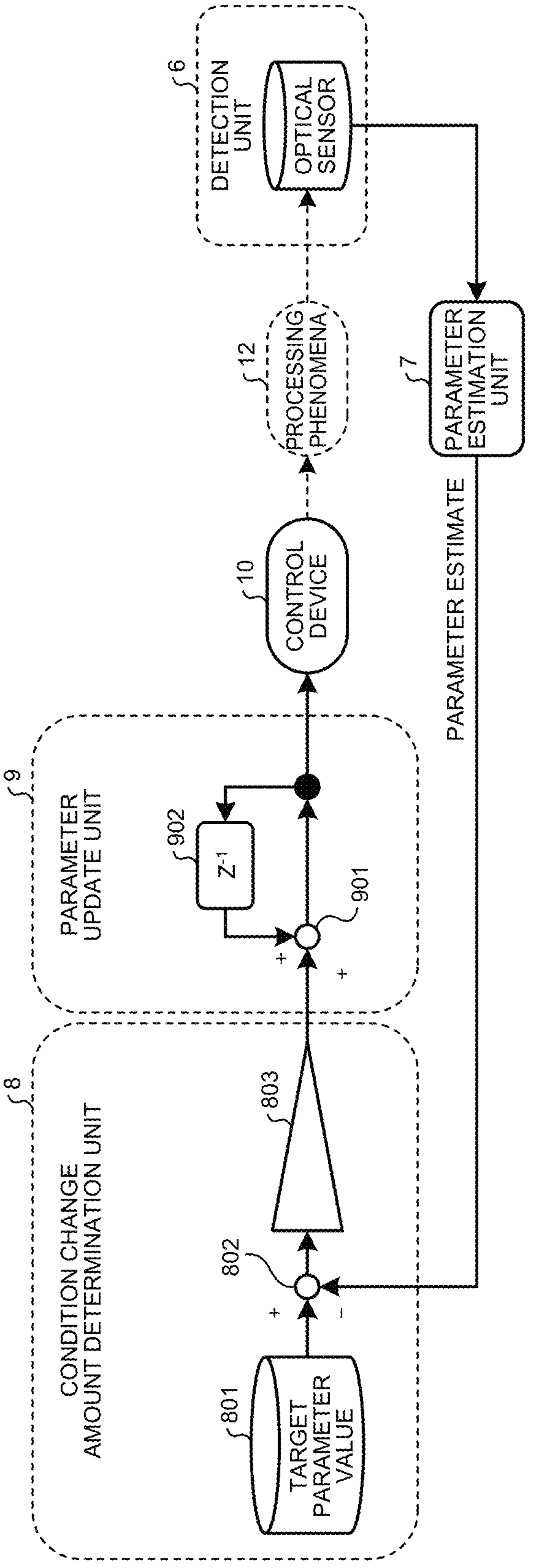
FIG. 3 is a diagram illustrating the parameter modification process that the laser processing apparatus according to the first embodiment performs.

FIG. 3 is a diagram illustrating the parameter modification process that the laser processing apparatus according to the first embodiment performs. FIG. 3 illustrates the parameter modification process to be performed by the laser processing apparatus 1 in block diagram form.

As the control device 10 of the laser processing apparatus 1 causes the processing to start, the laser light L is emitted to the workpiece 11, causing processing phenomena 12 such as metal melting, metal vaporization, and light emission. The optical sensor of the detection unit 6 observes light or the like generated during the processing as the processing state.

The detection unit 6 outputs observation data of the optical sensor as the time-series signal to the parameter estimation unit 7. The parameter estimation unit 7 computes the parameter estimate on the basis of the time-series signal indicating the observation data of the optical sensor and outputs the parameter estimate to the condition change amount determination unit 8.

The condition change amount determination unit 8 includes the target parameter value 801, a subtracter 802, and a change amount gain unit 803. The subtracter 802 of the condition change amount determination unit 8 calculates a parameter deviation by subtracting the parameter estimate from the preset target parameter value 801. The subtracter 802 outputs the parameter deviation to the change amount gain unit 803. The change amount gain unit 803 determines, as the amount of change for the parameter, the value obtained by multiplying the parameter deviation by a gain greater than 0 and smaller than or equal to 1. The change amount gain unit 803 outputs the amount of change for the parameter to the parameter update unit 9.

The parameter update unit 9 includes an adder 901 and a parameter buffer 902. The adder 901 of the parameter update unit 9 adds together the current parameter value obtained from the parameter buffer 902 and the amount of change for the parameter and determines that a resultant value be a new parameter value. Furthermore, the parameter update unit 9 stores the newly determined parameter value in the parameter buffer 902 and outputs the new parameter value to the control device 10.

The control device 10 updates the parameter value in the processing condition to the new parameter value received from the parameter update unit 9, thus changing the control setting of, for example, the laser oscillator 2, the actuator 4, or the processing head 5. The laser processing apparatus 1 can keep bringing the parameter estimate closer to the target parameter value 801 by repeating these operations illustrated in FIG. 3.

In the laser processing apparatus 1, the parameter value that has yielded the satisfactory processing is set as the target parameter value 801. Therefore, bringing the parameter estimate closer to the target parameter value 801 and maintaining this in the laser processing apparatus 1 mean bringing the processing state being observed by the detection unit 6 closer to a satisfactory state of processing and maintaining it. In this way, the laser processing apparatus 1 can keep bringing the processing phenomena 12 to satisfactory states.

If the parameter value changes significantly in a single update with the parameter estimate being inappropriate, the parameter value may be updated to an inappropriate value that causes any processing defects. Moreover, the significant amount of change in the parameter value may cause any processing defects.

Therefore, the condition change amount determination unit 8 according to the first embodiment may be configured to include an upper limit or a lower limit for the amount of change for the parameter value. In this case, when the amount of change for the parameter value is larger than the upper limit preset for the amount of change, the condition change amount determination unit 8 changes over from the amount of change for the parameter value to the upper limit for the amount of change. When the amount of change for the parameter value is smaller than the lower limit preset for the amount of change, the condition change amount determination unit 8 changes over from the amount of change for the parameter value to the lower limit for the amount of change.

The parameter update unit 9 may be configured to include an upper limit or a lower limit for the parameter value. In this case, when the newly determined parameter value is larger than the upper limit preset for the parameter value, the parameter update unit 9 changes over from the new parameter value to the upper limit for the parameter value. When the newly determined parameter value is smaller than the lower limit preset for the parameter value, the parameter update unit 9 changes over from the new parameter value to the lower limit for the parameter value.

Since there are various methods for the condition change amount determination unit 8 and the parameter update unit 9 to determine the new parameter value on the basis of the parameter deviation and the current parameter value, the above-described methods for determining the new parameter value are not limiting. The condition change amount determination unit 8 and the parameter update unit 9 can determine the new parameter value with a general control technique. For example, the condition change amount determination unit 8 and the parameter update unit 9 of the laser processing apparatus 1 may be combined into a single constituent element and use a proportional-integral-derivative (PID) control system that performs proportional control, integral control, and derivative control on the parameter deviation for determining the new parameter value.

In laser processing, the processing phenomena are complex phenomena involving solid, liquid, and gas. The processing condition is configured with many items, such as the output intensity and the frequency of the laser light L, the processing speed, beam focus position, and the pressure of the processing gas, and there are many combinations of these items. The laser processing apparatus 1 according to the first embodiment estimates the parameter estimate on the basis of the time-series signal data and the corresponding parameter information and determines the amount of change for the processing condition on the basis of the result of comparison between the target parameter value and the parameter estimate. The laser processing apparatus 1 also updates the processing condition to the new processing condition on the basis of the amount of change for the processing condition and the processing condition being set in the control device 10. Since the laser processing apparatus 1 can thus update the processing condition so that the satisfactory state of processing is approached, the laser processing apparatus 1 is capable of easily adjusting the processing condition. Therefore, the laser processing apparatus 1 can prevent the processing defects such as dross and flaws even when many processing conditions are used for the complex processing phenomena. Dross is a defect referring to an oxidation product that adheres to a lower face of an object to be processed, such as the workpiece 11, during laser processing. Flaws are a defect referring to irregularities in a processed surface.

A description is provided next of a hardware configuration for the parameter estimation unit 7, the condition change amount determination unit 8, the parameter update unit 9, and the control device 10 of the laser processing apparatus 1. The parameter estimation unit 7, the condition change amount determination unit 8, the parameter update unit 9, and the control device 10 are hereinafter referred to as information processing units.

The information processing units are implemented with processing circuitry. The processing circuitry may include a memory and a processor that executes programs stored in the memory or may be dedicated hardware. The processing circuitry is also referred to as control circuitry.

Figure 4:
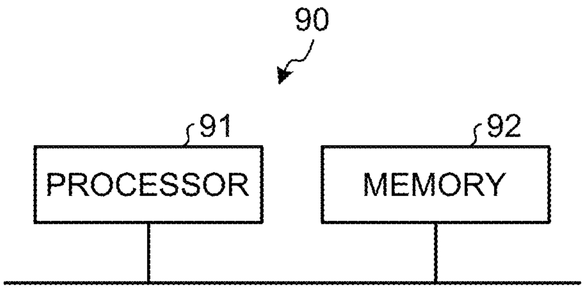
FIG. 4 is a diagram illustrating an example configuration of processing circuitry of the laser processing apparatus according to the first embodiment when the processing circuitry is implemented by a processor and a memory.

FIG. 4 is a diagram illustrating an example configuration of the processing circuitry of the laser processing apparatus according to the first embodiment when the processing circuitry is implemented by a processor and a memory. When the processing circuitry 90 includes the processor 91 and the memory 92, the functions of the processing circuitry 90 of the laser processing apparatus 1 are implemented with software, firmware, or a combination of software and firmware. The software, the firmware, or the like is described as programs and is stored in the memory 92. In the processing circuitry 90, the processor 91 reads and executes the programs stored in the memory 92 to implement the functions. This means that the memory 92 is included in the processing circuitry 90 to store the programs with which the processes of the information processing units of the laser processing apparatus 1 are eventually executed. These programs can be said to cause a computer to perform the processes and the methods of the information processing units of the laser processing apparatus 1.

The processor 91 here is, for example, a central processing unit (CPU), a processing unit, an arithmetic unit, a microprocessor, a microcomputer, or a digital signal processor (DSP). The memory 92 is, for example, a nonvolatile or volatile semiconductor memory such as a random-access memory (RAM), a read-only memory (ROM), a flash memory, an erasable programmable ROM (EPROM), or an electrically EPROM (EEPROM) (registered trademark). The memory 92 may be a magnetic disk, a flexible disk, an optical disk, a compact disk, a mini disk, a digital versatile disc (DVD), or the like.

Figure 5:
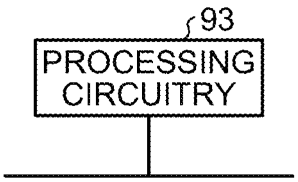
FIG. 5 is a diagram illustrating an example of the processing circuitry of the laser processing apparatus according to the first embodiment when the processing circuitry is configured as dedicated hardware.

FIG. 5 is a diagram illustrating an example of the processing circuitry of the laser processing apparatus according to the first embodiment when the processing circuitry is configured as dedicated hardware. When the processing circuitry is configured as the dedicated hardware, the processing circuitry 93 illustrated in FIG. 5 corresponds to, for example, a single circuit, a composite circuit, a programmed processor, a parallel programmed processor, an application-specific integrated circuit (ASIC), a field-programmable gate array (FPGA), or a combination of these.

The processing circuitry 90 or the processing circuitry 93 may implement the functions of the information processing units of the laser processing apparatus 1 individually or collectively. An internal location of the laser processing apparatus 1 is not a limiting example where the processing circuitry 90 or the processing circuitry 93 is installed.

For example, the processing circuitry 90 or the processing circuitry 93 may be disposed away from the laser processing apparatus 1 and connected to the laser processing apparatus 1 via a network. The processing circuitry 90 or 93 may include functions other than those of the parameter estimation unit 7, the condition change amount determination unit 8, the parameter update unit 9, and the control device 10. The constituent elements illustrated in FIG. 1 are not the limiting constituent elements of the laser processing apparatus 1. For example, the laser oscillator 2, the optical path 3, the actuator 4, the processing head 5, and others may be provided outside the laser processing apparatus 1.

As described above, the parameter estimation unit 7 of the laser processing apparatus 1 according to the first embodiment estimates the parameter estimate on the basis of the time-series signal data and the corresponding parameter information. The condition change amount determination unit 8 determines the amount of change for the processing condition on the basis of the result of comparison between the target parameter value and the parameter estimate. The parameter update unit 9 updates the processing condition to the new processing condition on the basis of the amount of change for the processing condition and the processing condition being set in the control device 10. Since the laser processing apparatus 1 can thus bring the parameter estimate closer to the target parameter value, the laser processing apparatus 1 is capable of updating the processing condition so that the processing state being observed by the detection unit 6 is brought closer to the satisfactory state of processing.

Since the laser processing apparatus 1 uses the corresponding parameter information for the update of the processing condition, the laser processing apparatus 1 can automatically adjust the processing condition with the reduced number of processings and quality evaluations. Therefore, the laser processing apparatus 1 is capable of easy adjustment to a processing condition that can yield a good processing result in laser processing.

Second Embodiment

Figure 6:
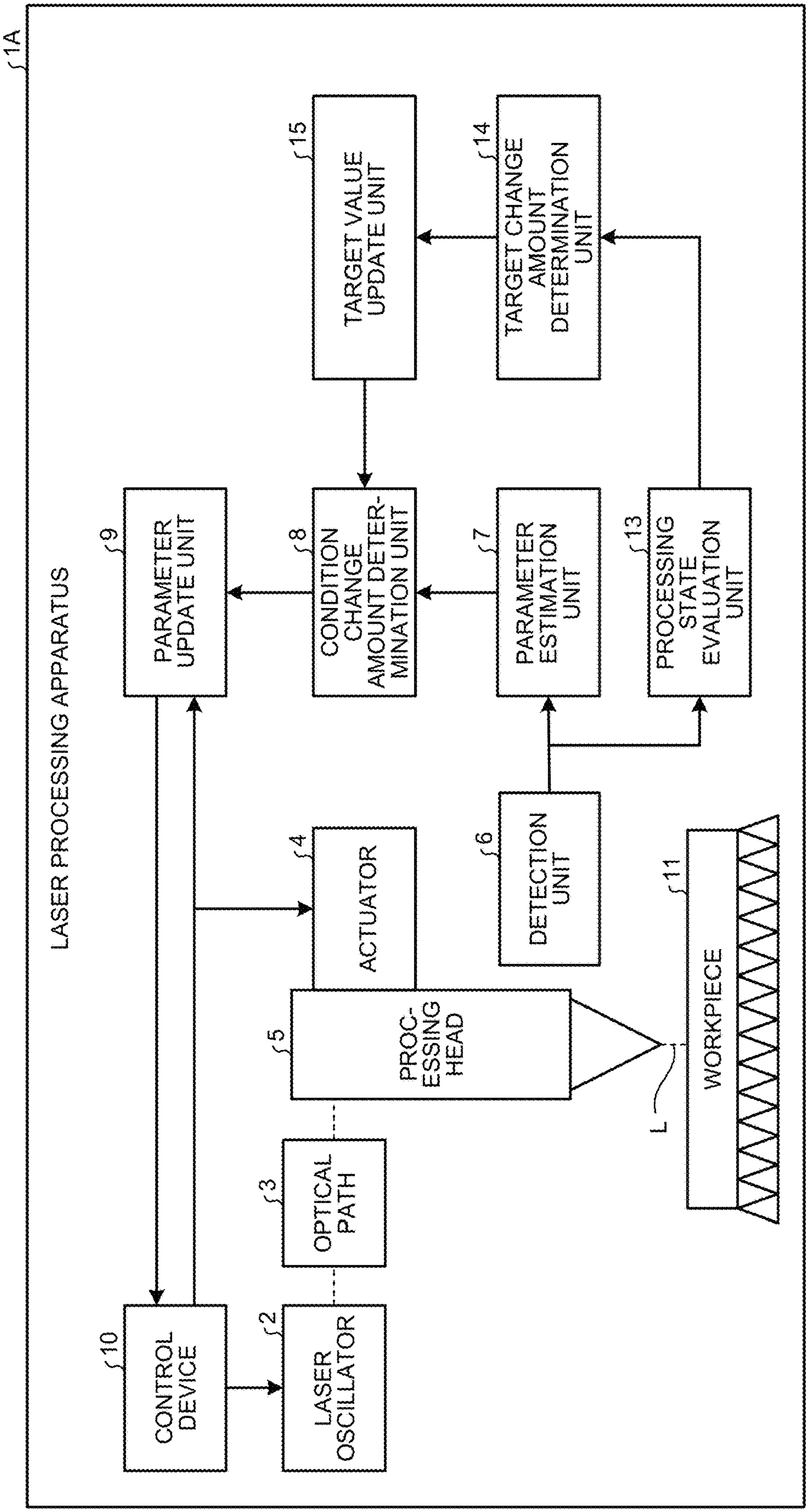
FIG. 6 is a diagram illustrating a configuration of a laser processing apparatus according to a second embodiment.
Figure 7:
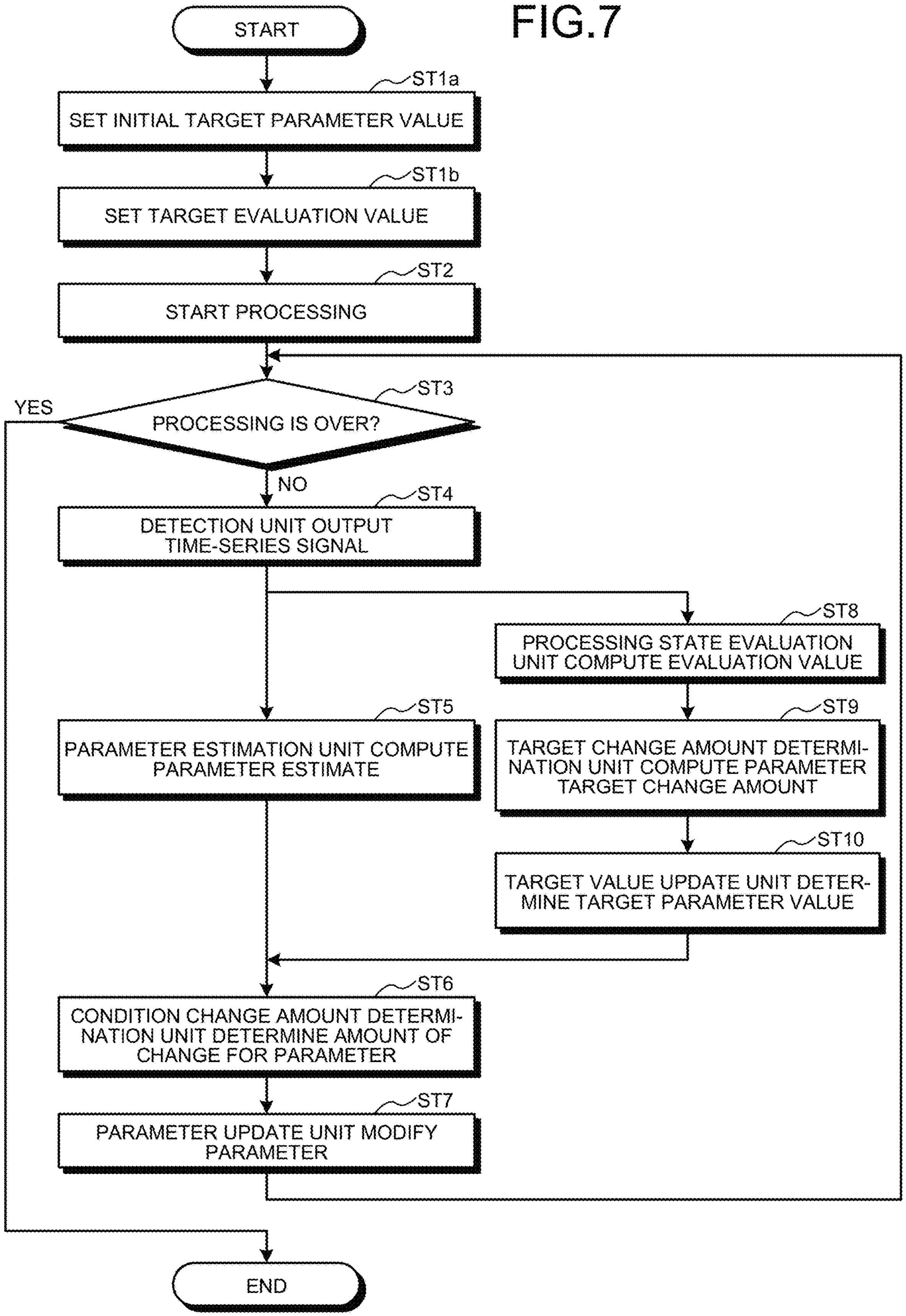
FIG. 7 is a flowchart illustrating a procedure for parameter modification process to be performed by the laser processing apparatus according to the second embodiment.
Figure 8:
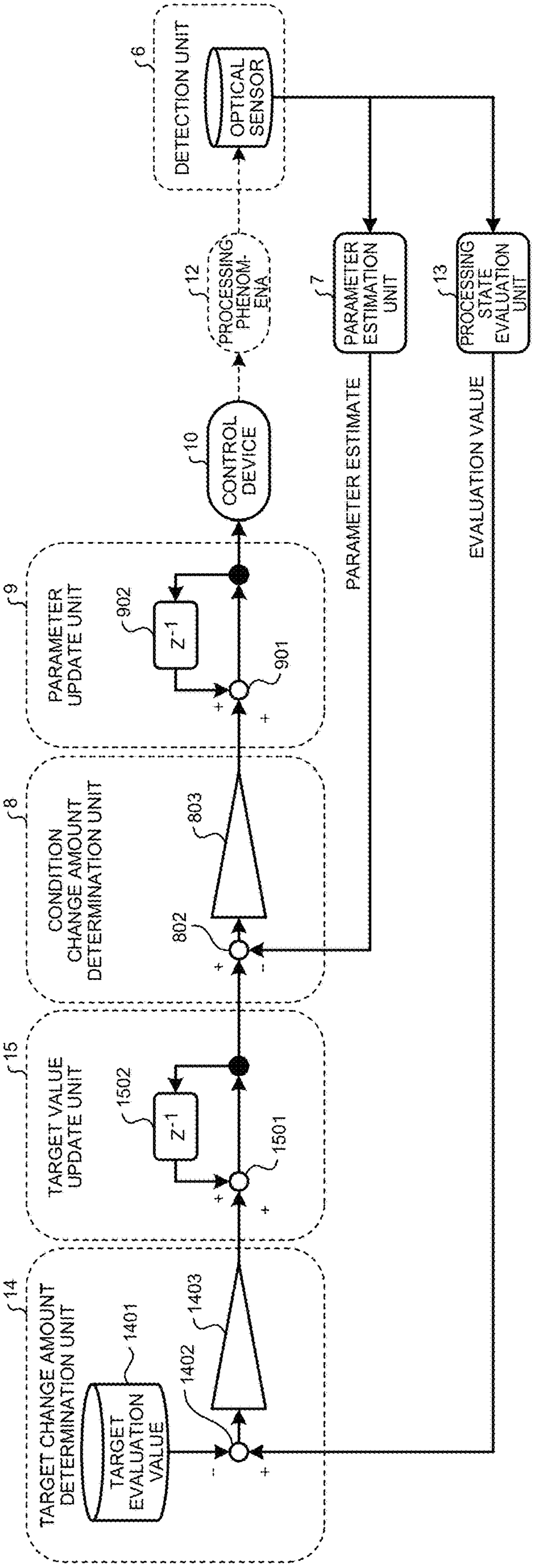
FIG. 8 is a diagram illustrating the parameter modification process that the laser processing apparatus according to the second embodiment performs.

With reference to FIGS. 6 to 8, a description is provided next of a second embodiment. In the second embodiment, a target parameter value is repeatedly changed on the basis of evaluation values for processing states.

FIG. 6 is a diagram illustrating a configuration of a laser processing apparatus according to the second embodiment. Among constituent elements in FIG. 6, constituent elements common to the laser processing apparatus 1 according to the first embodiment have the same names and the same reference characters as in the first embodiment and are not redundantly described.

A laser processing apparatus 1A according to the second embodiment adjusts a parameter value targeted for update to as large or small a value as possible within a range where good processing states are yielded. Therefore, the parameter value that the laser processing apparatus 1A targets for the update is a parameter value that is desirably a larger or smaller value.

Examples of the parameter value that the laser processing apparatus 1A targets for the update include a processing speed that is desirably larger for an improved production quantity per unit time and a gas pressure that is desirably smaller for reduced processing gas consumption, among others. If these parameter values targeted for the update are too large and too small, processing defects occur, preventing processings as desired by an operator. For this reason, the laser processing apparatus 1A adjusts the parameter value targeted for the update in a desired direction, that is to say, to as large or small a value as possible within the range where no processing defects occur.

The laser processing apparatus 1A according to the second embodiment evaluates the processing state and repeatedly changes, on the basis of the evaluation value that indicates an evaluation score, the target parameter value, thus automatically adjusting a parameter to be updated in the desired direction, that is to say, to a larger or smaller value within the range where the good processing states are yielded.

The laser processing apparatus 1A includes the laser oscillator 2, the optical path 3, the actuator 4, the processing head 5, the detection unit 6, the parameter estimation unit 7, the condition change amount determination unit 8, the parameter update unit 9, the control device 10, a processing state evaluation unit 13, a target change amount determination unit 14, and a target value update unit 15.

The processing state evaluation unit 13 uses time-series signal data including at least one of a time-series signal obtained from the detection unit 6 or a feature computed from the time-series signal obtained from the detection unit 6 to compute and output to the target change amount determination unit 14 the evaluation value evaluating the processing state. The time-series signal data that the processing state evaluation unit 13 uses is second time-series signal data, and the feature that the processing state evaluation unit 13 uses is a second feature. The features are, for example, a mean and a standard deviation of the time-series signal obtained from the detection unit 6.

The processing state evaluation unit 13 is preconfigured to include a relationship (hereinafter, referred to as corresponding evaluation information) between time-series signal data and the evaluation value. On the basis of the time-series signal data obtained during processing and the corresponding evaluation information, the processing state evaluation unit 13 computes and outputs to the target change amount determination unit 14 the evaluation value that corresponds to the time-series signal data obtained during the processing.

When the processing state evaluation unit 13 uses the feature(s) computed from the time-series signal obtained from the detection unit 6, the feature(s) to be used can be the same as or different from the feature(s) to be used by the parameter estimation unit 7.

The processing state evaluation unit 13 switches a method of determining the feature(s) according to the configuration of the detection unit 6 or the type of detection unit 6. There are various methods by which the processing state evaluation unit 13 determines the features. As described in the first embodiment, various values can be used by the processing state evaluation unit 13 as the features.

On the basis of the time-series signal data and the corresponding evaluation information, the processing state evaluation unit 13 determines the evaluation value for the time-series signal data-based processing state.

When obtaining the corresponding evaluation information to be set in the processing state evaluation unit 13, laser processing is performed using plural processing conditions that have different values specified for the parameter to be updated. The time-series signal data obtained during the laser processings and the evaluation value are stored in a database or the like. When the corresponding evaluation information is to be set in the processing state evaluation unit 13, the correspondence between the evaluation value targeted for update and the time-series signal data needs only to be extracted from this database.

There are various ways to assign the evaluation values during preparation of the database. For example, the operator may assign the evaluation value by checking and scoring a processing result. The operator may preset the evaluation value for each defect's symptom and its degree of defectiveness. Through the operator's visual check or analysis of a photograph taken of the processing result, each defect's symptom and its degree of defectiveness may be determined, and the evaluation value may be assigned on the basis of a result of the determination.

There are various methods for configuring the corresponding evaluation information, which indicates the correspondence between the time-series signal data and the evaluation value, from the database. For example, a corresponding evaluation information preparer may directly define a value range for the time-series signal data and set the corresponding evaluation value. The corresponding evaluation information preparer may have the correspondence between the time-series signal data and the evaluation value expressed by a function. The corresponding evaluation information preparer may use a regression model learned to output the evaluation value as the time-series signal data is input. In other words, the function that indicates the corresponding evaluation information may be the regression model trained by regression learning to output the evaluation value corresponding to the input time-series signal data.

If used, the regression model is a general regression model such as linear regression, support vector regression, Gaussian process regression, regression using decision trees (regression trees), a neural network, a deep neural network, a recurrent neural network, or a convolutional neural network.

A target evaluation value desired by the operator is set in the target change amount determination unit 14 by the operator. The target change amount determination unit 14 compares the preset target evaluation value and the evaluation value output from the processing state evaluation unit 13 and determines an amount of change for the target parameter value (hereinafter referred to as the parameter target change amount) on the basis of a comparison result.

In cases where the parameter value targeted for the update is desirably as large a value as possible, the target change amount determination unit 14 determines that the parameter target change amount should be a positive value if the evaluation value is larger than the target evaluation value and determines that the parameter target change amount should be a negative value if the evaluation value is smaller than the target evaluation value.

On the other hand, in cases where the parameter value targeted for the update is desirably as small a value as possible, the target change amount determination unit 14 determines that the parameter target change amount should be a negative value if the evaluation value is larger than the target evaluation value and determines that the parameter target change amount should be a positive value if the evaluation value is smaller than the target evaluation value.

In its step of comparing the target evaluation value and the evaluation value, the target change amount determination unit 14 may compute a difference or a ratio between the target evaluation value and the evaluation value, or a magnitude relation. After performing its appropriate step based on the comparison method, the target change amount determination unit 14 determines the parameter target change amount. In cases where the parameter value targeted for the update is desirably as large a value as possible, when using, for example, the difference between the evaluation value and the target evaluation value (i.e., the evaluation value−the target evaluation value), the target change amount determination unit 14 can determine the parameter target change amount by multiplying the difference by a constant gain that is a preset value. The target change amount determination unit 14 sends the parameter target change amount to the target value update unit 15.

The target value update unit 15 obtains the parameter target change amount from the target change amount determination unit 14. The current target parameter value is stored in the target value update unit 15. The target value update unit 15 may read the current target parameter value from the condition change amount determination unit 8. On the basis of the parameter target change amount obtained from the target change amount determination unit 14 and the current target parameter value, the target value update unit 15 computes a new target parameter value. Specifically, the target value update unit 15 adds the parameter target change amount to the current target parameter value and sends the target parameter value that has undergone the addition to the condition change amount determination unit 8 as the new target parameter value.

An initial target parameter value to be set in the target value update unit 15 is set based on each processing result yielded in order for corresponding parameter information set in the parameter estimation unit 7 to be obtained. An initial target parameter value preparer needs only to examine each processing result, which has been yielded in order for the corresponding parameter information to be obtained, and set a parameter value corresponding to a processing result desired by the operator as the initial target parameter value in the target value update unit 15.

Since there are various methods for the target change amount determination unit 14 and the target value update unit 15 to determine the new target parameter value on the basis of the target evaluation value and the evaluation value, the above-described methods for determining the target parameter value are not limiting. The target change amount determination unit 14 and the target value update unit 15 can determine the target parameter value with a general control technique. For example, the target change amount determination unit 14 and the target value update unit 15 of the laser processing apparatus 1A may be combined into a single constituent element and use a PID control system that performs proportional control, integral control, and derivative control on the difference between the target evaluation value and the evaluation value for determining the target parameter value.

A hardware configuration of the laser processing apparatus 1A is similar to the hardware configuration of the laser processing apparatus 1 and thus is not described.

FIG. 7 is a flowchart illustrating a procedure for parameter modification process to be performed by the laser processing apparatus according to the second embodiment. Overlapping steps described in the first embodiment with reference to FIG. 2 are not described.

First, the operator sets the initial target parameter value that corresponds to the desired processing result in the target value update unit 15 (step ST1*a*). Furthermore, the operator sets the desired target evaluation value in the target change amount determination unit 14 (step ST1*b*). It is to be noted that either the initial target parameter value or the target evaluation value may be set first. Thereafter, the laser processing apparatus 1A starts processing (step ST2).

The laser processing apparatus 1A determines whether or not the processing is over (step ST3). If the processing is over (step ST3, Yes), the laser processing apparatus 1A ends the parameter modification process. If, on the other hand, the processing is not over (step ST3, No), the detection unit 6 of the laser processing apparatus 1A observes a processing state and outputs a time-series signal to the parameter estimation unit 7 and the processing state evaluation unit 13 (step ST4).

The parameter estimation unit 7 receives the time-series signal from the detection unit 6, and the processing state evaluation unit 13 receives the time-series signal from the detection unit 6.

Upon receiving the time-series signal from the detection unit 6, the parameter estimation unit 7 computes a parameter estimate (step ST5). Specifically, the parameter estimation unit 7 estimates the parameter estimate on the basis of time-series signal data and the corresponding parameter information. The parameter estimation unit 7 outputs the parameter estimate to the condition change amount determination unit 8.

Upon receiving the time-series signal from the detection unit 6, the processing state evaluation unit 13 computes the evaluation value (step ST8). Specifically, the processing state evaluation unit 13 computes the evaluation value on the basis of time-series signal data and the corresponding evaluation information. The processing state evaluation unit 13 outputs the evaluation value to the target change amount determination unit 14.

The target change amount determination unit 14 computes a parameter target change amount on the basis of the target evaluation value and the evaluation value (step ST9). The target change amount determination unit 14 outputs the parameter target change amount to the target value update unit 15.

On the basis of the current target parameter value and the parameter target change amount, the target value update unit 15 determines a new target parameter value (step ST10). The target value update unit 15 outputs the new target parameter value to the condition change amount determination unit 8. Using the new target parameter value received from the target value update unit 15, the condition change amount determination unit 8 updates the target parameter value.

It is to be noted that either a sequence of steps ST8 to ST10 or step ST5 may be performed first, or the sequence of steps ST8 to ST10 and step ST5 may be performed concurrently. Once the laser processing apparatus 1A completes both step ST5 and step ST10, the laser processing apparatus 1A performs step ST6.

In other words, the condition change amount determination unit 8 determines an amount of change intended for the parameter on the basis of the parameter estimate and the new target parameter value (step ST6). The condition change amount determination unit 8 outputs the amount of change for the parameter to the parameter update unit 9.

The parameter update unit 9 modifies the parameter of a processing condition on the basis of the amount of change for the parameter (step ST7). Thereafter, the laser processing apparatus 1A returns to step ST3, and repeats steps ST3 to ST10 until the processing ends.

FIG. 8 is a diagram illustrating the parameter modification process that the laser processing apparatus according to the second embodiment performs. FIG. 8 illustrates the parameter modification process to be performed by the laser processing apparatus 1A in block diagram form. Overlapping operations described in the first embodiment with reference to FIG. 3 are not described. Among constituent elements in FIG. 8, constituent elements common to FIG. 3 have the same names and the same reference characters as in FIG. 3 and are not redundantly described. A description is provided here of a case where a parameter for which a larger value is desirable, such as the processing speed, is selected as the parameter to be updated.

As the control device 10 of the laser processing apparatus 1A causes the processing to start, the laser light L is emitted to the workpiece 11, causing the processing phenomena 12 such as metal melting, metal vaporization, and light emission. The optical sensor of the detection unit 6 observes light or the like generated during the processing as the processing state.

The detection unit 6 outputs observation data of the optical sensor as the time-series signal to the parameter estimation unit 7 and the processing state evaluation unit 13. The parameter estimation unit 7 computes the parameter estimate on the basis of the time-series signal indicating the observation data of the optical sensor and outputs the parameter estimate to the condition change amount determination unit 8. The processing state evaluation unit 13 computes the evaluation value on the basis of the time-series signal and outputs the evaluation value to the target change amount determination unit 14. Here the processing state evaluation unit 13 outputs a larger evaluation value when the processing state is good and a smaller evaluation value when the processing state is bad.

For example, the processing state evaluation unit 13 outputs a numerical value between "0" and "1" inclusive as the evaluation value. In this case, the processing state evaluation unit 13 outputs "1" if the processing state is good, lowers the evaluation value as the degree of defectiveness increases, and eventually outputs "0". In other words, the processing state evaluation unit 13 brings the evaluation value closer to "0" as the degree of defectiveness increases.

The target change amount determination unit 14 includes the target evaluation value 1401, a subtracter 1402, and a change amount gain unit 1403. The subtracter 1402 of the target change amount determination unit 14 calculates an evaluation value deviation by subtracting the preset target evaluation value 1401 from the evaluation value. The subtracter 1402 outputs the evaluation value deviation to the change amount gain unit 1403. The change amount gain unit 1403 determines the parameter target change amount by multiplying the evaluation value deviation and the gain that is the preset constant. Specifically, the change amount gain unit 1403 determines the parameter target change amount by multiplying the evaluation value deviation by the gain that is greater than 0 and smaller than or equal to 1. The value that the change amount gain unit 1403 uses here for the gain needs to be set in accordance with an evaluation value computation method, the range, and a parameter value update period, among others. The change amount gain unit 1403 outputs the parameter target change amount to the target value update unit 15.

The target value update unit 15 includes an adder 1501 and a parameter buffer 1502. The adder 1501 of the target value update unit 15 adds together the current target parameter value obtained from the parameter buffer 1502 and the parameter target change amount and determines that a resultant value be the new target parameter value. Furthermore, the target value update unit 15 stores in the parameter buffer 1502 the newly determined target parameter value and outputs the new target parameter value to the condition change amount determination unit 8.

The subtracter 802 of the condition change amount determination unit 8 calculates a parameter deviation by subtracting the parameter estimate from the new target parameter value. Thereafter, the condition change amount determination unit 8, the parameter update unit 9, and the control device 10 perform the same operations as described in FIG. 3. The laser processing apparatus 1A can keep bringing the parameter estimate closer to the target parameter value that corresponds to the target evaluation value 1401 by repeating these operations illustrated in FIG. 8.

As described above, the laser processing apparatus 1A according to the second embodiment repeatedly changes the target parameter value on the basis of the evaluation values for the processing states. In this way, the laser processing apparatus 1A can automatically adjust the parameter to be updated in the desired direction, that is to say, to a larger or smaller value within the range where the good processing states are yielded.

The above configurations illustrated in the embodiments are illustrative, can be combined with other techniques that are publicly known, and can be partly omitted or changed without departing from the gist. The embodiments can be combined with each other.

REFERENCE SIGNS LIST

1, 1A laser processing apparatus; 2 laser oscillator; 3 optical path; 4 actuator; 5 processing head; 6 detection unit; 7 parameter estimation unit; 8 condition change amount determination unit; 9 parameter update unit; 10 control device; 11 workpiece; 12 processing phenomena; 13 processing state evaluation unit; 14 target change amount determination unit; 15 target value update unit; 90, 93 processing circuitry; 91 processor; 92 memory; 801 target parameter value; 802, 1402 subtracter; 803, 1403 change amount gain unit; 901, 1501 adder; 902, 1502 parameter buffer; 1401 target evaluation value; L laser light.

The invention claimed is:

1. A laser processing apparatus comprising:

control circuitry configured to control laser processing in accordance with a processing condition for the laser processing;

a detector configured to observe, on a time-series basis, at least one of sound or light generated during execution of the laser processing as a processing state during execution of the laser processing and output a signal corresponding to an observation result as a time-series signal;

parameter estimation circuitry configured to estimate, on a basis of first time-series signal data and corresponding parameter information, a parameter value, included in the processing condition and targeted for update, that corresponds to the first time-series signal data, and output the estimated parameter value as a parameter estimate, the first time-series signal data including at least one of the time-series signal or a first feature computed from the time-series signal, the corresponding parameter information being preset in the parameter estimation circuitry and being information indicating correspondence between the first time-series signal data and the parameter value included in the processing condition and targeted for update;

condition change amount determination circuitry configured to compare a target parameter value that is a target value for the parameter value and the parameter estimate and determine an amount of change for the parameter value of the processing condition to bring the parameter estimate closer to the target parameter value, on a basis of a comparison result; and parameter update circuitry configured to update the processing condition by changing the parameter value on a basis of the amount of change and the processing condition, wherein the control circuitry is configured to control the laser processing in accordance with the processing condition including the parameter value updated by the parameter update circuitry, and wherein during the laser processing, the detector, the parameter estimation circuitry, the condition change amount determination circuitry, and the parameter update circuitry are configured to sequentially and repeatedly perform detection of the time-series signal, output of the parameter estimate based on the corresponding parameter information that is preset, determination of the amount of change, and update of the parameter value of the processing condition.

2. The laser processing apparatus according to claim 1, comprising:

processing state evaluation circuitry configured to output an evaluation value evaluating the processing state on a basis of second time-series signal data including at least one of the time-series signal or a second feature computed from the time-series signal;

target change amount determination circuitry configured to compare the evaluation value and a target evaluation value that is a preset target value for the evaluation value and determine a parameter target change amount that is an amount of change for the target parameter value on the basis of the comparison result; and target value update circuitry configured to update the target parameter value on a basis of the parameter target change amount.

3. The laser processing apparatus according to claim 1, wherein the corresponding parameter information is information in which correspondence is set between the first time-series signal data detected by the detector when the laser processing is performed using a plurality of the processing conditions having different values specified for a parameter to be updated and the parameter value used when the first time-series signal data is detected.

4. The laser processing apparatus according to claim 3, wherein the corresponding parameter information is a function indicating correspondence between the first time-series signal data and the parameter value.

5. The laser processing apparatus according to claim 4, wherein the function is a regression model trained by regression learning to output the parameter value that corresponds to the first time-series signal data when the first time-series signal data is input, and the parameter estimation circuitry takes an output obtained by inputting the first time-series signal data detected by the detector during processing to the regression model as the parameter estimate.

6. The laser processing apparatus according to claim 3, wherein the parameter estimation circuitry is configured to learn correspondence between the first time-series signal data detected by the detector when the laser processing is performed using the plurality of the processing conditions having different values specified for the parameter and the parameter value that corresponds to the processing condition in generating the corresponding parameter information.

7. The laser processing apparatus according to claim 3, wherein the corresponding parameter information is learned information representing a relationship between the parameter value and the first time-series signal data stored in a database, the first time-series signal data and the parameter value being obtained by performing the laser processing using a plurality of parameter values within a configurable range of the parameter value.

8. The laser processing apparatus according to claim 7, wherein the database further stores processing results, each processing result being a determination result of the laser processing performed using a corresponding one of the plurality of parameter values within the configurable range, and the target parameter value is selected from among the parameter values based on the processing results, each processing result including at least one of a determination of whether a processed result is good or bad, a symptom of a defect, or a degree of defectiveness.

9. The laser processing apparatus according to claim 3, wherein the corresponding parameter information includes information in which correspondence is set between the first time-series signal data detected by the detector when the laser processing is performed using the plurality of processing conditions having different values specified for the parameter to be updated, and a set of parameter values used when the first time-series signal data is detected, wherein the first time-series signal data and the set of parameter values are included in a selected data set selected based on a processing result recorded for the laser processing.

10. The laser processing apparatus according to claim 9, wherein the corresponding parameter information is a function indicating correspondence between the first time-series signal data and the parameter value.

11. The laser processing apparatus according to claim 10, wherein the function is a regression model trained by regression learning to output the parameter value that corresponds to the first time-series signal data when the first time-series signal data is input, and the parameter estimation circuitry takes an output obtained by inputting the first time-series signal data detected by the detector during processing to the regression model as the parameter estimate.

12. The laser processing apparatus according to claim 9, wherein the parameter estimation circuitry is configured to learn correspondence between the first time-series signal data detected by the detector when the laser processing is performed using the plurality of the processing conditions having different values specified for the parameter and the parameter value that corresponds to the processing condition in generating the corresponding parameter information.

13. The laser processing apparatus according to claim 9, wherein the processing result includes at least one of a determination of whether a processed result is good or bad, a symptom of a defect, or a degree of defectiveness.

14. The laser processing apparatus according to claim 13, wherein the corresponding parameter information is a function indicating correspondence between the first time-series signal data and the parameter value.

15. The laser processing apparatus according to claim 13, wherein the parameter estimation circuitry is configured to learn correspondence between the first time-series signal data detected by the detector when the laser processing is performed using the plurality of the processing conditions having different values specified for the parameter and the parameter value that corresponds to the processing condition in generating the corresponding parameter information.

16. The laser processing apparatus according to claim 1, wherein the condition change amount determination circuitry is configured to determine that a value obtained by multiplying a difference between the target parameter value and the parameter estimate by a preset value greater than 0 and smaller than or equal to 1 be an amount of change for the processing condition.

17. The laser processing apparatus according to claim 1, wherein the condition change amount determination circuitry is configured to change over from the amount of change determined for the processing condition to an upper limit preset when the amount of change for the processing condition is larger than the upper limit, and change over from the amount of change determined for the processing condition to a lower limit preset when the amount of change for the processing condition is smaller than the lower limit.

18. The laser processing apparatus according to claim 1, wherein the parameter update circuitry is configured to compute the parameter value of the processing condition on the basis of the amount of change and the processing condition, change over from the parameter value computed to an upper limit preset when the parameter value is larger than the upper limit, and change over from the parameter value computed to a lower limit preset when the parameter value is smaller than the lower limit.

19. The laser processing apparatus according to claim 1, wherein a parameter included in the processing condition includes at least one of output intensity of a laser light, an output frequency of the laser light, an output duty ratio of the laser light, processing speed, focal position of the laser light relative to a workpiece, pressure of a processing gas, a height where a nozzle is to be as measured from the workpiece, or beam magnification of the laser light.

20. A laser processing method for laser processing to be performed in accordance with a processing condition for the laser processing, the laser processing method comprising:

a detection of observing, on a time-series basis, at least one of sound or light generated during execution of the laser processing as a processing state during execution of the laser processing and outputting a signal corresponding to an observation result as a time-series signal;

a parameter estimation of estimating, on a basis of first time-series signal data and corresponding parameter information, a parameter value, included in the processing condition and targeted for update, that corresponds to the first time-series signal data, and outputting the estimated parameter value as a parameter estimate, the first time-series signal data including at least one of the time-series signal or a first feature computed from the time-series signal, the corresponding parameter information being preset and information indicating a relationship correspondence between the first time-series signal data and at least the parameter value included in the processing condition and targeted for update;

a condition change amount determination of comparing a target parameter value that is a target value for the parameter value and the parameter estimate and determining an amount of change for the parameter value of the processing condition to bring the parameter estimate closer to the target parameter value, on a basis of a comparison result; and a parameter update of updating the processing condition by changing the parameter value on a basis of the amount of change and the processing condition, wherein the laser processing is controlled in accordance with the processing condition including the parameter value updated in the parameter update, and wherein during the laser processing, detection of the time-series signal, output of the parameter estimate based on the corresponding parameter information that is preset, determination of the amount of change, and update of the parameter value of the processing condition are performed sequentially and repeatedly in the detection, the parameter estimation, the condition change amount determination, and the parameter update.

* * * * *